United States Patent
Takada et al.

(10) Patent No.: US 10,581,053 B2
(45) Date of Patent: Mar. 3, 2020

(54) CONNECTION MODULE FOR A POWER STORAGE GROUP OF PLURAL POWER STORAGE ELEMENTS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Kotaro Takada, Mie (JP); Osamu Nakayama, Mie (JP); Mitsutoshi Morita, Mie (JP); Koichiro Mochizuki, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 16/099,256

(22) PCT Filed: Apr. 19, 2017

(86) PCT No.: PCT/JP2017/015664
§ 371 (c)(1),
(2) Date: Nov. 6, 2018

(87) PCT Pub. No.: WO2017/195546
PCT Pub. Date: Nov. 16, 2017

(65) Prior Publication Data
US 2019/0198842 A1    Jun. 27, 2019

(30) Foreign Application Priority Data

May 9, 2016  (JP) .................. 2016-093712

(51) Int. Cl.
*H01R 3/00* (2006.01)
*H01M 2/20* (2006.01)
(Continued)

(52) U.S. Cl.
CPC ......... *H01M 2/202* (2013.01); *H01M 2/1077* (2013.01); *H01M 2/20* (2013.01);
(Continued)

(58) Field of Classification Search
CPC .................................................... Y02E 60/12
(Continued)

(56) References Cited

U.S. PATENT DOCUMENTS

| 6,186,831 B1* | 2/2001 | Tsai | H01R 4/34 |
| | | | 174/70 B |
| 6,247,962 B1* | 6/2001 | DeSorbo | H01R 11/282 |
| | | | 439/170 |

(Continued)

FOREIGN PATENT DOCUMENTS

| JP | 2013-016382 | 1/2013 |
| JP | 2015-111537 | 6/2015 |

(Continued)

OTHER PUBLICATIONS

Supplementary Europe Search Report conducted in counterpart Europe Appln. No. EP 17 79 5907.9 (dated Mar. 20, 2019).
(Continued)

*Primary Examiner* — Thanh Tam T Le
(74) *Attorney, Agent, or Firm* — Greenblum & Bernstein, P.L.C.

(57) ABSTRACT

In a connection module attached to a single battery group from a first direction, a detection terminal connected to an electrode terminal of the single battery group includes: a body portion made of a metal plate material formed in an approximately rectangular plate shape; and a projection
(Continued)

portion in a plate shape connected to a base edge of the body portion and having a plate surface intersecting with a plate surface of the body portion. An insulation protector of the connection module includes a holding portion holding the detection terminal in a posture in which the plate surface of the body portion is orthogonal to the first direction. The holding portion includes a locking piece. A lower surface of a claw portion provided at the lower end of the locking piece locks the plate surface of the body portion and restricts the movement of the detection terminal in the first direction.

5 Claims, 10 Drawing Sheets

(51) Int. Cl.
H01M 2/34 (2006.01)
H01M 2/10 (2006.01)
H01M 2/26 (2006.01)
H01R 13/639 (2006.01)

(52) U.S. Cl.
CPC ............... *H01M 2/26* (2013.01); *H01M 2/34* (2013.01); *H01R 13/639* (2013.01)

(58) Field of Classification Search
USPC .................. 439/500, 627; 429/158, 160, 121
See application file for complete search history.

(56) References Cited

U.S. PATENT DOCUMENTS

| | | | | |
|---|---|---|---|---|
| 8,426,056 | B2* | 4/2013 | Ikeda | H01M 2/206 429/156 |
| 8,976,534 | B2* | 3/2015 | Warmuth | H01M 2/202 361/748 |
| 9,184,432 | B2* | 11/2015 | Nakayama | H01M 2/206 |
| 9,660,243 | B2* | 5/2017 | Nakayama | H01M 2/1077 |
| 9,780,351 | B2* | 10/2017 | Shimoda | B60L 58/21 |
| 2014/0045388 | A1 | 2/2014 | Nakayama | |
| 2014/0080364 | A1 | 3/2014 | Nakayama et al. | |
| 2016/0254515 | A1 | 9/2016 | Shimoda et al. | |

FOREIGN PATENT DOCUMENTS

| | | |
|---|---|---|
| JP | 2015-138604 | 7/2015 |
| WO | 2013/011756 | 1/2013 |

OTHER PUBLICATIONS

Official Communication issued in International Bureau of WIPO Patent Application No. PCT/JP2017/015664, dated Jun. 6, 2017.

\* cited by examiner

FIG.5
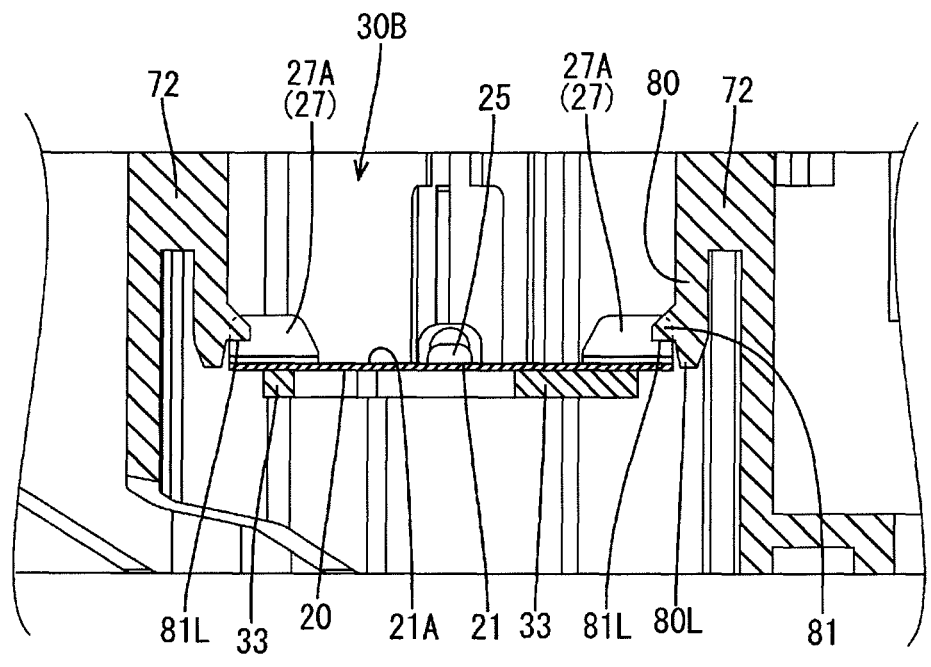

FIG.10
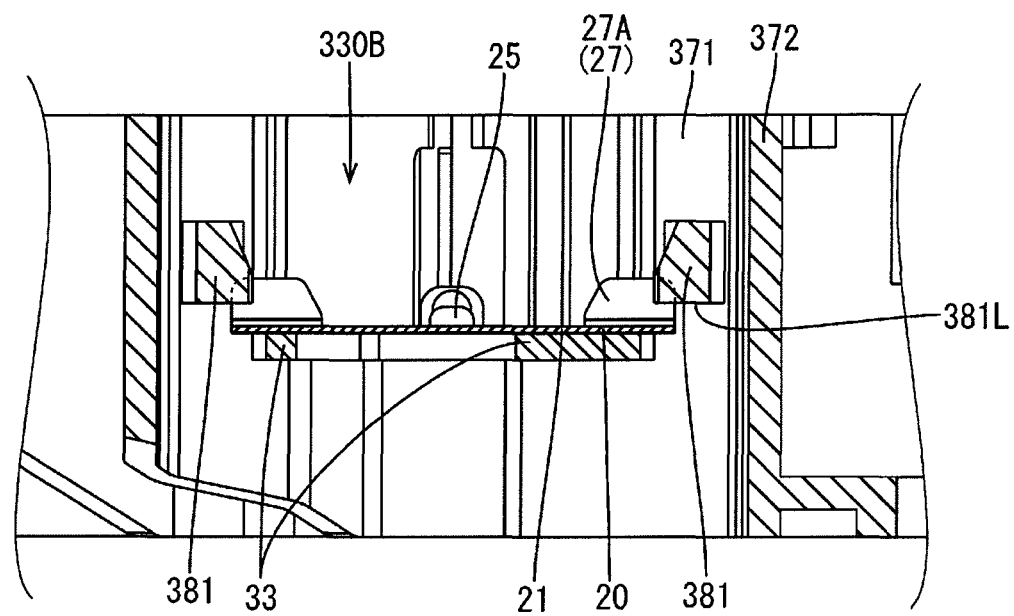
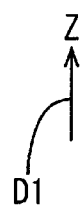

CONNECTION MODULE FOR A POWER STORAGE GROUP OF PLURAL POWER STORAGE ELEMENTS

TECHNICAL FIELD

The technique disclosed herein relates to a connection module.

BACKGROUND ART

A conventionally used power storage module specifically for electric vehicles and hybrid vehicles includes a power storage element group formed by lining up many power storage elements in a row, to increase output. In such a power storage module, a connection module including an insulation protector holding a connection member is attached to the power storage element group to connect electrode terminals of adjacent power storage elements by the connection member, thus connecting the plurality of power storage elements. A voltage detection terminal for detecting the voltage of a single battery is overlaid on the connection member. An electric wire connected to the detection terminal is housed in an electric wire housing groove formed in the insulation protector, and led to a battery ECU.

An example of the above-mentioned connection module is disclosed in Patent Document 1 listed below. In this connection module, a detection terminal is obliquely placed in a holding portion of a housing member (insulation protector), and the extending direction of an electric wire connected to the detection terminal is inclined with respect to the extending direction of a connection member, to save the placement space for an electric wire connection portion and the space for bending the electric wire and thus achieve size reduction. The holding portion is provided with a partition wall surrounding the holding portion, and the detection terminal is placed so that at least three corners of the four corners of its body portion, which has an approximately rectangular plate shape, intersect with the partition wall. one or more of these corners are fitted into a recess in the partition wall of the holding portion for positioning, and the remaining corners are inserted into through recesses on the inner surface of the partition wall for retention.

CITATION LIST

Patent Documents

Patent Document 1: JP 2013-16382A

SUMMARY OF INVENTION

Technical Problem

However, structural constraints and the like may make it difficult to provide, in the holding portion, the partition wall at a position suitable for the positioning and retention of the detection terminal and the like.

The technique disclosed herein has been conceived in view of the circumstances described above, and has the object to improve the design freedom of a holding portion holding a connection member and a conductive member such as a detection terminal in a connection module.

Solution to Problem

A connection module disclosed herein is a connection module that is attached, from a first direction, to a power storage element group formed by lining up a plurality of power storage elements including electrode terminals, the connection module including: a conductive member connected to the electrode terminal; and an insulation protector including a holding portion holding the conductive member, wherein the conductive member includes: a body portion made of a metal plate material in an approximately rectangular plate shape; and a projection portion projecting from one edge of the body portion in a direction intersecting with a plate surface of the body portion, and the holding portion includes a locking piece including: a first locking portion that restricts a movement of the conductive member in a direction orthogonal to the plate surface of the body portion; and a second locking portion that restricts a movement of the conductive member in a direction parallel to the plate surface of the body portion.

With such a structure, the conductive member is held by the holding portion in a state in which the movement (rising) of the conductive member in the first direction which is the connection module attachment direction is suppressed by the first locking portion. Simultaneously, the movement of the conductive member in the direction parallel to the plate surface of the body portion is restricted by the second locking portion. Thus, the locking piece can restrict the movement of the conductive member in the two directions. Components necessary for stably holding the conductive member can therefore be reduced. This improves the design freedom of the holding portion.

In the connection module disclosed herein, the first locking portion may lock the plate surface of the body portion or the projection portion from the first direction, and the second locking portion may lock the projection portion from the direction parallel to the plate surface of the body portion. With such a structure, the movement of the conductive member in the direction orthogonal to the plate surface of the body portion and in the direction parallel to the plate surface of the body portion can be restricted reliably.

In the connection module disclosed herein, the conductive member may include a plurality of the projection portions, and further include a connection portion extending from the one edge and connected to a terminal of an electric wire, and the connection portion may be located between the projection portions, at the one edge. With such a structure, the conductive member having the connection portion is held in the holding portion in a state in which the projection portion is locked on both sides of the connection portion. This suppresses the rotation and the like of the conductive member caused by a force acting on the connection portion or the electric wire connected to the connection portion, so that the conductive member can be held stably In the connection module disclosed herein, the holding portion may include a base end wall opposite the one edge of the body portion, and the locking piece may be formed on the base end wall as a deflectable elastic piece. With such a structure, the movement of the detection terminal to the one edge side is restricted by the base end wall, and also the locking piece can be provided by a simple structure. Thus, only the structure provided in the vicinity of the base end wall is used to restrict the movement of the conductive member in each direction, to achieve positioning and retention. Since a structure for holding the detection terminal need not be provided in the part of the holding portion holding the front edge of the body portion opposite to the one edge, the design freedom of the holding portion can be improved significantly.

In the connection module disclosed herein, the holding portion may include a base end wall opposite the one edge of the body portion and a side wall opposite two side edges linked to both sides of the one edge of the body portion, and the locking piece may be formed on the side wall as a deflectable elastic piece. With such a structure, the movement of the conductive member to both side edge sides is further restricted by the side wall. Hence, the conductive member can be held more stably by a simple structure.

Advantageous Effects of Invention

The technique disclosed herein can improve the design freedom of a holding portion holding a detection terminal in a connection module.

BRIEF DESCRIPTION OF DRAWINGS

FIG. 5 is a sectional view along A-A in FIG. 4.

FIG. 10 is a sectional view along C-C in FIG. 9.

DESCRIPTION OF EMBODIMENTS

Embodiment 1

Figure 1:
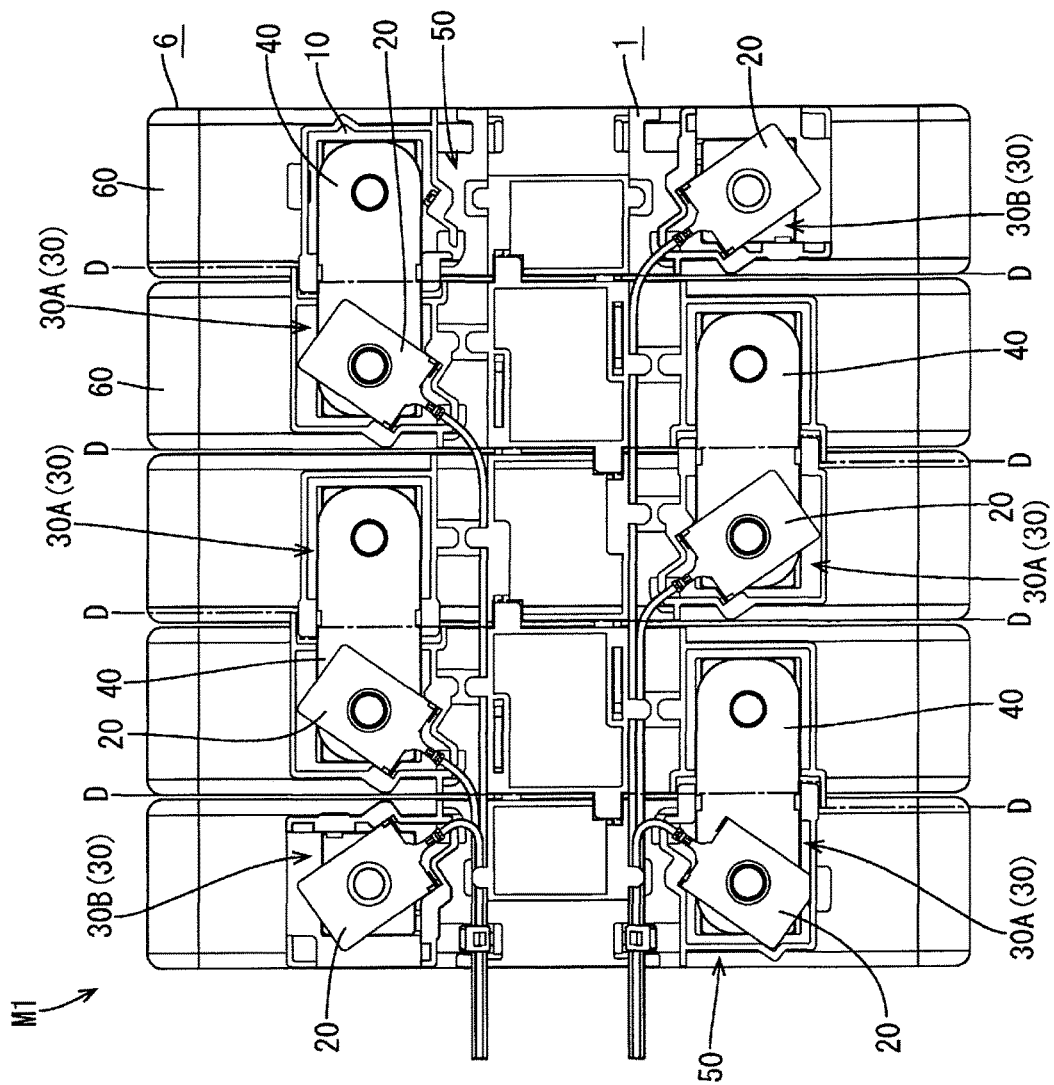
FIG. 1 is a plan view of a power storage module with a connection module according to Embodiment 1 attached therein.

A battery module M1 with a connection module 1 according to Embodiment 1 attached therein is described below, with reference to FIGS. 1 to 5.

In the following description, the direction upward from the paper plane in FIG. 1 (Z direction in FIG. 5, etc.) is referred to as the upward direction, the left side (Y direction) as the leftward direction, and the lower side (X direction) as the forward direction. For a plurality of the same members, only some of those members may be given reference numerals while omitting reference numerals for the other members.

Battery Module M1

The battery module M1 (an example of a power storage module) shown in FIG. 1 is, for example, mounted on a vehicle such as an electric vehicle or a hybrid vehicle (not shown), and used as a power source for driving the vehicle. The battery module M1 is roughly composed of a single battery group 6 (an example of a power storage element group, see FIG. 2) formed by lining up a plurality of single batteries 60 (an example of power storage elements), and a connection module 1 (see FIG. 3) attached to the upper surface of the single battery group 6.

Single Battery Group 6

Figure 2:
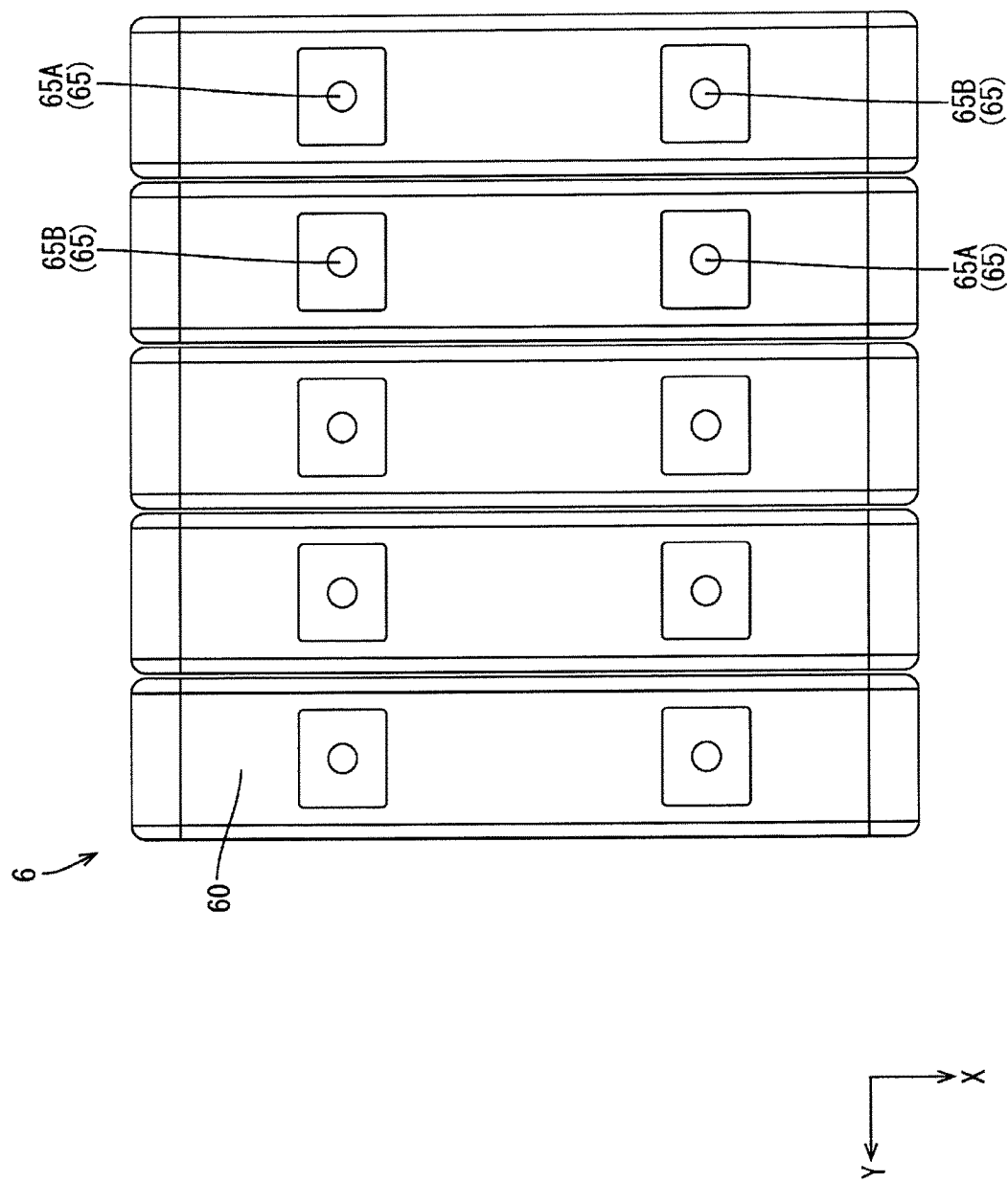
FIG. 2 is a plan view of a power storage element group.

The single battery group 6 is formed by lining up the plurality of single batteries 60 (five single batteries 60 in this embodiment) in a row in the right-left direction, as shown in FIG. 2.

Single Battery 60

Each single battery 60 shown in FIG. 2, etc. has an outer shape of a flat rectangular parallelepiped, and has a pair of electrode terminals 65 formed at positions near its two ends on one surface. One of the pair of electrode terminals 65 is a positive electrode terminal 65A, and the other one of the pair of electrode terminals 65 is a negative electrode terminal 65B. Each electrode terminal 65 in this embodiment has a screw hole into which a screw thread of a bolt (not shown) can be screwed to fasten the below-mentioned bus bar 40 and detection terminal 20. The plurality of single batteries 60 have the electrode terminals 65 on their upper surface, and are arranged in a row in the right-left direction so that two single batteries 60 adjacent in the right-left direction have electrode terminals 65 of different polarities adjacent to each other (i.e. on the right or left of the positive electrode terminal 65A of one single battery 60, the negative electrode terminal 65B of another single battery 60 adjacent to the one single battery 60 is located), and fixed by a fixing member (not shown).

Connection Module 1

Figure 3:
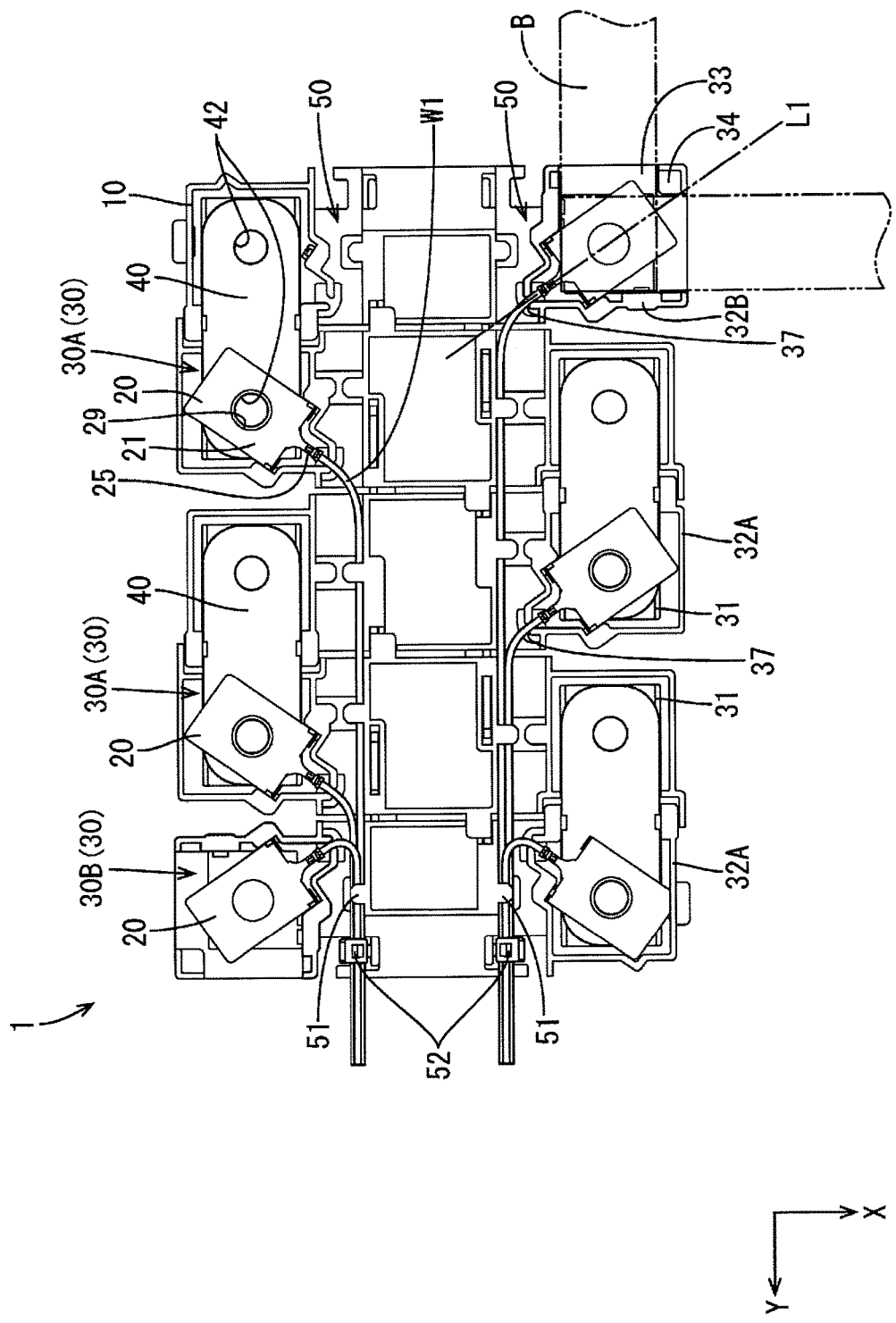
FIG. 3 is a plan view of the connection module.

The connection module 1 according to this embodiment is attached to the upper surface of each single battery 60 in the single battery group 6 from above, as shown in FIG. 1, etc. In this embodiment, the upward direction is a first direction D1. As shown in FIG. 3, the connection module 1 includes a plurality of bus bars 40 connected to the electrode terminals 65, a plurality of detection terminals 20 (an example of conductive members) overlaid on the bus bars 40 or the electrode terminals 65 to detect the voltages of the single batteries 60, and an insulation protector 10 holding the bus bars 40 and the detection terminals 20.

Bus Bar 40

The bus bars 40 can be formed, for example, by punching a metal plate material made of copper, a copper alloy, aluminum, an aluminum alloy, stainless steel (SUS), or the like. As shown in FIG. 1, etc., each bus bar 40 is formed in an approximately rectangular plate shape, and its dimension in the longitudinal direction is set depending on the distance between the electrode terminals 65A and 65B of adjacent single batteries 60. Each bus bar 40 is housed in a holding portion 30 of the insulation protector 10, extending in the right-left direction. A pair of circular insertion holes 42 formed near the right and left ends of the bus bar 40 overlap (match) the electrode terminals 65A and 65B of adjacent two single batteries 60, and bolts for fastening are inserted through these holes.

Detection Terminal 20

Figure 4:
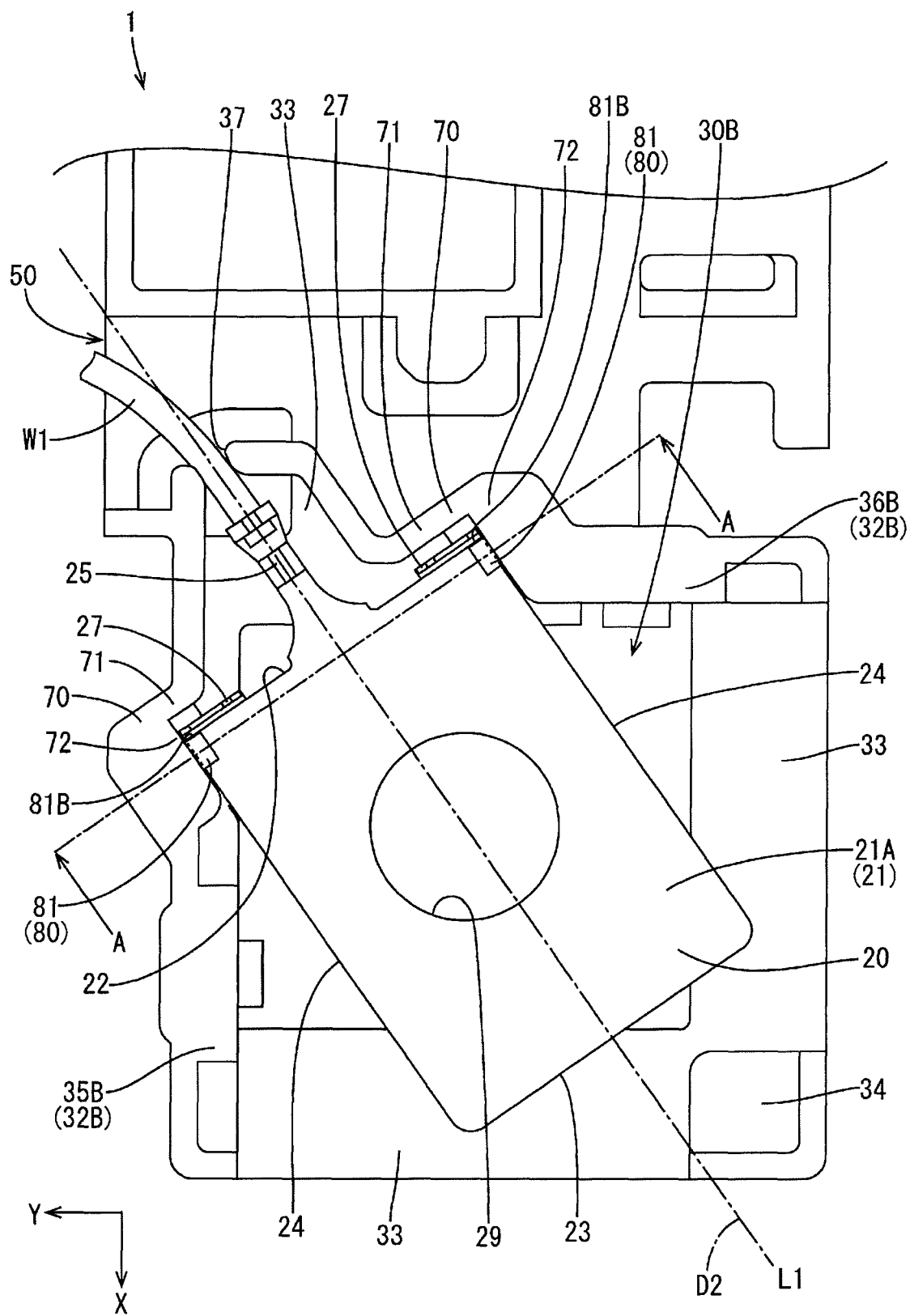
FIG. 4 is a partially enlarged plan view of a detection terminal holding portion.

The detection terminals 20 can be formed, for example, by pressing a punched metal plate material made of copper, a copper alloy, aluminum, an aluminum alloy, stainless steel (SUS), or the like into a predetermined shape. As shown in FIGS. 3 to 5, each detection terminal 20 includes a body portion 21 made of a metal plate material formed in a plate shape, and a barrel portion 25 (connection portion) extending from one edge of the body portion 21 and connected to a terminal of a detection electric wire W1.

As shown in FIG. 4, etc., the body portion 21 has an approximately rectangular plate surface 21A having four approximately right-angled corners, with a center line extending in the longitudinal direction being set as its axis L1. The detection terminal 20 is held in the holding portion 30 of the below-mentioned insulation protector 10 in a posture in which its axis L1 is inclined with respect to the right-left direction. The body portion 21 has a circular through hole 29 approximately at its center. The through hole 29 overlaps the insertion hole 42 of the bus bar 40 or the electrode terminal 65, and a bolt for fastening them is inserted through the hole. The barrel portion 25 extends from one short-side edge of the four edges of the body portion 21. Hereafter, the edge at which the barrel portion 25 is formed in the body portion 21 is referred to as a base edge 22 (one edge), the edge opposite the base edge 22 is referred to as a front edge 23, and the two edges connecting the base edge 22 and the front edge 23 and opposite each other are referred to as side edges 24, as shown in FIG. 4.

The barrel portion 25 formed at the base edge 22 is connected, through pressure bonding or the like, with a conductor portion exposed by removing an insulation coating (insulation layer) in a terminal portion of the detection electric wire W1 composed of a coated electric wire. As shown in FIG. 4, etc., the barrel portion 25 is formed along the axis L1 of the body portion 21, and the detection electric wire W1 is led out in the direction coinciding with the axis L1. The detection electric wire W1 is collected in the below-mentioned electric wire housing groove 50, and guided to a battery ECU (Electronic Control Unit) (not shown) outside the battery module M1. The battery ECU is a well-known system including a microcomputer, elements, and the like, and has the functions of, for example, detecting the voltage, current, temperature, and the like of each single battery 60 and controlling the charge and discharge of the single battery 60.

The detection terminal 20 according to this embodiment has a pair of projection portions 27 projecting from the base edge 22. The projection portions 27 are formed on both sides of the barrel portion 25 at the base edge 22 protruding upward from the plate surface 21A of the body portion 21, as shown in FIGS. 4, 5, etc. For example, the projection portions 27 can be formed by extending and bending part of the edge on the base edge 22 side of the metal plate material forming the body portion 21. In this embodiment, the projection portions 27 project in the direction perpendicular to the plate surface 21A of the body portion 21, and have a plate surface 27A orthogonal to the axis L1 and an upper edge 27U parallel to the plate surface 21A. The pair of projection portions 27 are formed to be symmetric in dimension and shape with respect to the axis L1. Hereafter, the direction along the axis L1 (direction parallel to the plate surface 21A) is referred to as a second direction D2.

Insulation Protector 10

The insulation protector 10 is made of an insulation material such as synthetic resin. As shown in FIG. 3, the insulation protector 10 includes a plurality of holding portions 30 holding the respective bus bars 40 and/or detection terminals 20, and an electric wire housing groove 50 housing the detection electric wires W1. In the insulation protector 10 in this embodiment, the plurality of holding portions 30 are arranged in a row along each of the front edge and rear edge of the insulation protector 10 extending in the right-left direction, and one electric wire housing groove 50 extends in the right-left direction on each of the back side of the holding portions 30 in the front row and the front side of the holding portions 30 in the back row.

The insulation protector 10 in this embodiment is composed of five connection units having an approximately rectangular outline extending in the front-back direction in a planar view (line D-D in FIG. 1 represents a boundary line between connection units), where the single batteries 60 and the connection units are in a one-to-one correspondence with each other, as shown in FIG. 1, etc. The connection units are connected to each other by engaging an engaging portion in each connection unit with an engaged portion in a connection unit adjacent to the connection unit. When the connection units are connected in the right-left direction, the structures formed on the upper surfaces of the connection units are combined with each other, thus forming the below-mentioned connection holding portion 30A and forming the electric wire housing groove 50.

Electric Wire Housing Groove 50

The electric wire housing grooves 50 are formed in a groove shape extending in the right-left direction on the upper surface of the insulation protector 10, as shown in FIG. 3, etc. The detection electric wire W1 connected to the detection terminal 20 is led to these electric wire housing grooves 50, as described later. A plurality of detection electric wires W1 collected in the electric wire housing grooves 50 extend leftward while being locked by claw pieces 51 provided in an upper portion of the electric wire housing grooves 50, and are fixed by an electric wire fixing portion 52 provided at the left end, and guided out of the connection module 1.

Holding Portion 30

In this embodiment, two holding portions 30 to the right in the back row and two holding portions 30 to the left in the front row constitute connection holding portions 30A having an approximately rectangular outline in a planar view, as shown in FIG. 3, etc. Each connection holding portion 30A includes a bottom plate 31 on which the bus bar 40 or the like is mounted, and a housing wall 32A erected in a rectangular tube shape as a whole on the periphery of the bottom plate 31. The housing wall 32A surrounds both the electrode terminals 65A and 65B of two single batteries 60 adjacent in the right-left direction in a state in which the insulation protector 10 is attached to the upper surface of the single battery group 6. The housing wall 32A is erected surrounding the bus bar 40 to a height at which contact with a tool or the like is prevented, in order to prevent a short circuit caused by a tool or the like coming into contact with the electrode terminal 65 and the bus bar 40. The bottom plate 31 is open at the position corresponding to the electrode terminals 65. The bus bar 40 is mounted on the bottom plate 31 so that the two insertion holes 42 overlap the electrode terminals 65A and 65B, and housed and held in the connection holding portion 30A. One detection terminal 20 is then overlaid on the bus bar 40 so that one of the two insertion holes 42 of the bus bar 40 matches the through hole 29, and held.

The holding portions 30 at the right end of the front row and at the left end of the back row are end holding portions 30B having an approximately square outline in a planar view. Each end holding portion 30B includes a mounting plate 33 on which the detection terminal 20 is mounted, a pillar portion 34 erected from the mounting plate 33 at the corner of the insulation protector 10, and a housing wall 32B erected from the mounting plate 33 and having an approximately L-shaped outline open to the pillar portion 34. The mounting plate 33 is open downward at the position corresponding to the electrode terminal 65. The detection terminal 20 is mounted on the mounting plate 33 so that the through hole 29 overlaps the electrode terminal 65, and housed and held in the end holding portion 30B. Moreover, an output bus bar B or the like can also be held in the end holding portion 30B with one end protruding from the insulation protector 10, as shown by the dash-dotted line in FIG. 3.

Holding Structure for Detection Terminal 20

A structure for holding the detection terminal 20 in a predetermined position and posture, which relates to a principal part of the present invention, is described below.

The detection terminal 20 is mounted either on the bus bar 40 mounted on the bottom plate 31 of the connection holding portion 30A or on the mounting plate 33 of the end holding portion 30B, and held in the holding portion 30 in a posture in which the plate surface 21A of the body portion 21 is horizontal, i.e. a posture in which the plate surface 21A of the body portion 21 is orthogonal to the first direction D1. In the connection module 1 according to this embodiment, the detection terminal 20 is held basically by the same holding structure except the connection holding portion 30A at the left end of the front row, as shown in FIG. 3, etc. The holding structure in the end holding portion 30B at the right end of the front row is described as an example below.

As shown in FIG. 4, in the end holding portion 30B at the right end of the front row, the pillar portion 34 is erected at the right front corner of the mounting plate 33, and the housing wall 32B is erected at each of the left edge and the rear edge of the mounting plate 33. Hereafter, the housing wall 32B located at the left edge from among the housing walls 32B is referred to as a left wall 35B, and the housing wall 32B located at the rear edge as a rear wall 36B. A gap 37 is formed between the left wall 35B and the rear wall 36B, i.e. at the left back corner of the end holding portion 30B.

The gap 37 is provided so that the end holding portion 30B communicates with the electric wire housing groove 50 on the back side of the end holding portion 30B. The detection terminal 20 is held in an inclined posture with respect to the right-left direction so that the axis L1 is located on the line connecting the gap 37 and the electrode terminal 65. Thus, the detection electric wire W1 connected to the barrel portion 25 extending in the direction inclined with respect to the right-left direction passes through the gap 37 in the direction inclined with respect to the electric wire housing groove 50 and meets other detection electric wires W1, and is housed in the electric wire housing groove 50 while curving gently.

A recess 70 into which the corner of the body portion 21 of the detection terminal 20 on the base edge 22 side is fitted from above is formed in a part of the left wall 35B near the back and a part of the rear wall 36B near the left, i.e. at predetermined positions on both sides of the corner of the housing wall 32B, as shown in FIG. 4, etc. The recess 70 has a base end wall 71 opposite the base edge 22 and a side wall 72 opposite the side edge 24 at a position near the base edge 22, in a state in which the detection terminal 20 is fitted therein. Thus, the detection terminal 20 is held while being positioned (locked) in a predetermined position.

A locking piece 80 elastically deformable outward is formed on the inner surface of the side wall 72, as shown in FIGS. 4 and 5. The locking piece 80 is formed between two slits extending upward from the lower end of the side wall 72, in a cantilever form having a lower end as a free end. A claw portion 81 projecting in the inward direction of the end holding portion 30B in an approximately rectangular shape in a top view and an approximately trapezoidal shape in a side view is formed in a part of the locking piece 80 near the lower end. The body portion 21 of the detection terminal 20 can be placed on the lower side of the claw portion 81, and the projection portion 27 of the detection terminal 20 can be placed on the base end wall 71 side of the claw portion 81.

To hold the detection terminal 20 in the end holding portion 30B, the detection terminal 20 is pushed from above the end holding portion 30B so that each corner on the base edge 22 side is fitted into the corresponding recess 70. As a result, the body portion 21 comes into contact with the claw portion 81, and consequently the locking piece 80 elastically deforms toward the outside of the side wall 72. When the detection terminal 20 is pushed further below the claw portion 81, the locking piece 80 elastically recovers and is located on the upper side of the plate surface 21A and the front edge 23 side of the plate surface 27A.

In the structure described above, the lower surface 81L of the claw portion 81 functions as a first locking portion that locks the plate surface 21A of the body portion 21 and restricts the movement of the detection terminal 20 in the upward direction (first direction D1). Moreover, the side surface 81B of the claw portion 81 on the base end wall side functions as a second locking portion that locks the plate surface 27A of the projection portion 27 and restricts the movement of the detection terminal 20 in the direction along the axis L1 (second direction D2). Further, the lower end 80L of the locking piece 80 hanging down below the claw portion 81 is located along the side edge 24 of the body portion 21 of the detection terminal 20 to stably hold the detection terminal 20, as shown in FIG. 5.

Assembly Method for Battery Module M1

An example of an assembly method for the battery module M1 in this embodiment is described below.

Before assembling the battery module M1 in this embodiment, the single battery group 6 is produced by arranging and fixing the plurality of single batteries 60 in the right-left direction so that the electrode terminals 65 are located on the upper surface (FIG. 2).

When assembling the connection module 1 in this embodiment, first, the five connection units are combined to form the insulation protector 10. Following this, the bus bars 40 are housed in the connection holding portions 30A of the insulation protector 10. The detection terminals 20 connected with the detection electric wires W1 are then placed at predetermined positions in the connection holding portions 30A and overlaid on the bus bars 40, or placed at predetermined positions on the mounting plates 33 of the end holding portions 30B. Here, by pushing the detection terminals 20 from above to the predetermined position in the connection holding portions 30A or the end holding portions 30B as mentioned above, the detection terminals 20 can be held in a retained and positioned state. The detection electric wires W1 connected to the barrel portions 25 of the detection terminals 20 are then led to the electric wire housing grooves 50 through the gap 37 of the housing wall 32A or the housing wall 32B, and extended leftward while being locked by the claw pieces 51. The detection electric wires W1 are further fixed by the electric wire fixing portion 52 provided at the left end of the connection module 1, and led to the outside.

The connection module 1 in this embodiment assembled in this way is attached to the upper surface of the single battery group 6 produced beforehand, from above (first direction D1). In detail, the connection module 1 is mounted on the upper surface of the single battery group 6, and connection bolts (not shown) are inserted through the insertion hole 42 of the bus bars 40 and/or the through holes 29 of the detection terminals 20 to electrically connect the electrode terminals 65, the bus bars 40, and the detection terminals 20. The output bus bar B is attached to each end holding portion 30B protruding in a desired direction, according to need. The battery module M1 is thus completed.

Operations and Effects

The operations and effects of this embodiment are described below.

In the connection module 1 according to this embodiment, the plate surface 21A of the body portion 21 is locked by the lower surface 81L (first locking portion) of the claw portion 81 of the locking piece 80, so that the detection terminal 20 is held in the holding portion 30 in a state in which its movement (rising up) in the upward direction (first direction D1) which is the direction of attachment to the insulation protector 10, i.e. the direction orthogonal to the plate surface 21A, is suppressed. Simultaneously, the plate surface 27A of the projection portion 27 is locked by the side surface 81B (second locking portion) of the claw portion 81, so that the movement of the detection terminal 20 in the direction along the axis L1 (second direction D2), i.e. the direction parallel to the plate surface 21A, is restricted. Since the movement of the detection terminal 20 in the two directions can be simultaneously restricted by the locking piece 80 in this way, the components necessary for stably holding the detection terminal 20 can be reduced. This improves the design freedom of the holding portion 30. In detail, for example, there is no need to provide the housing wall 32B at the front edge and the right edge in the end holding portion 30B at the right end of the front row, and so the output bus bar B can be attached to protrude forward or rightward.

In the connection module 1 according to this embodiment, the detection terminal 20 has the barrel portion 25 extending from the base edge 22 of the body portion 21 and connected to the terminal of the detection electric wire W1. At the base edge 22 of the body portion 21, the projection portions 27 are provided on both sides of the barrel portion 25. In the end holding portion 30B of the insulation protector 10, the locking piece 80 having the claw portion 81 is provided on each of the side walls 72 formed at the left wall 35B and the rear wall 36B. With such a structure, the detection terminal 20 is locked in the insulation protector 10 by the locking piece 80 on both sides of the barrel portion 25. This effectively suppresses the rotation and the like of the detection terminal 20 caused by a force acting on the barrel portion 25 or the detection electric wire W1.

In the connection module 1 according to this embodiment, the recess 70 into which the corner of the base edge 22 of the detection terminal 20 is fitted is formed in the housing wall 32A or the housing wall 32B of the holding portion 30. The recess 70 has the base end wall 71 opposite the plate surface of the projection portion 27 on the base edge 22 side, and the side wall 72 opposite the side edge 24 of the body portion 21. With such a structure, the movement of the detection terminal 20 to the base edge 22 side is restricted by the base end wall 71, and the movement of the detection terminal 20 to the side edge 24 side is restricted by the side wall 72. Thus, the positioning and retention of the detection terminal 20 can be performed with only the structure provided on the base edge 22 side, together with the locking piece 80. Since a structure for holding the detection terminal 20 need not be provided on the front edge 23 side of the detection terminal 20, the design freedom of the holding portion 30 can be improved significantly.

In the connection module 1 according to this embodiment, the locking piece 80 is formed on the inner surface of the side wall 72 as a deflectable elastic piece. Hence, the detection terminal 20 can be held stably by a simple structure.

Embodiment 2

Figure 6:
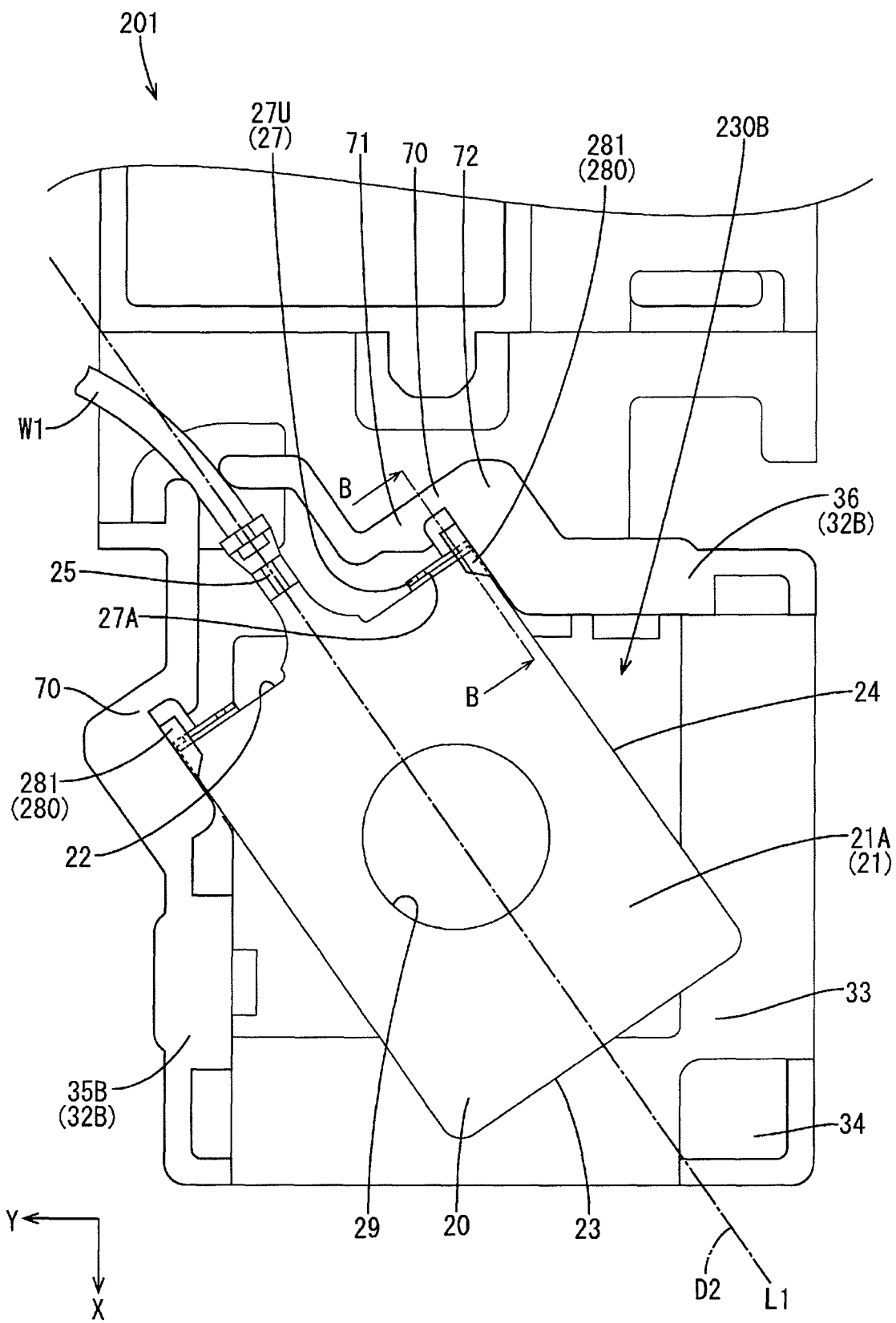
FIG. 6 is a partially enlarged plan view of a detection terminal holding portion in a connection module according to Embodiment 2.
Figure 7:
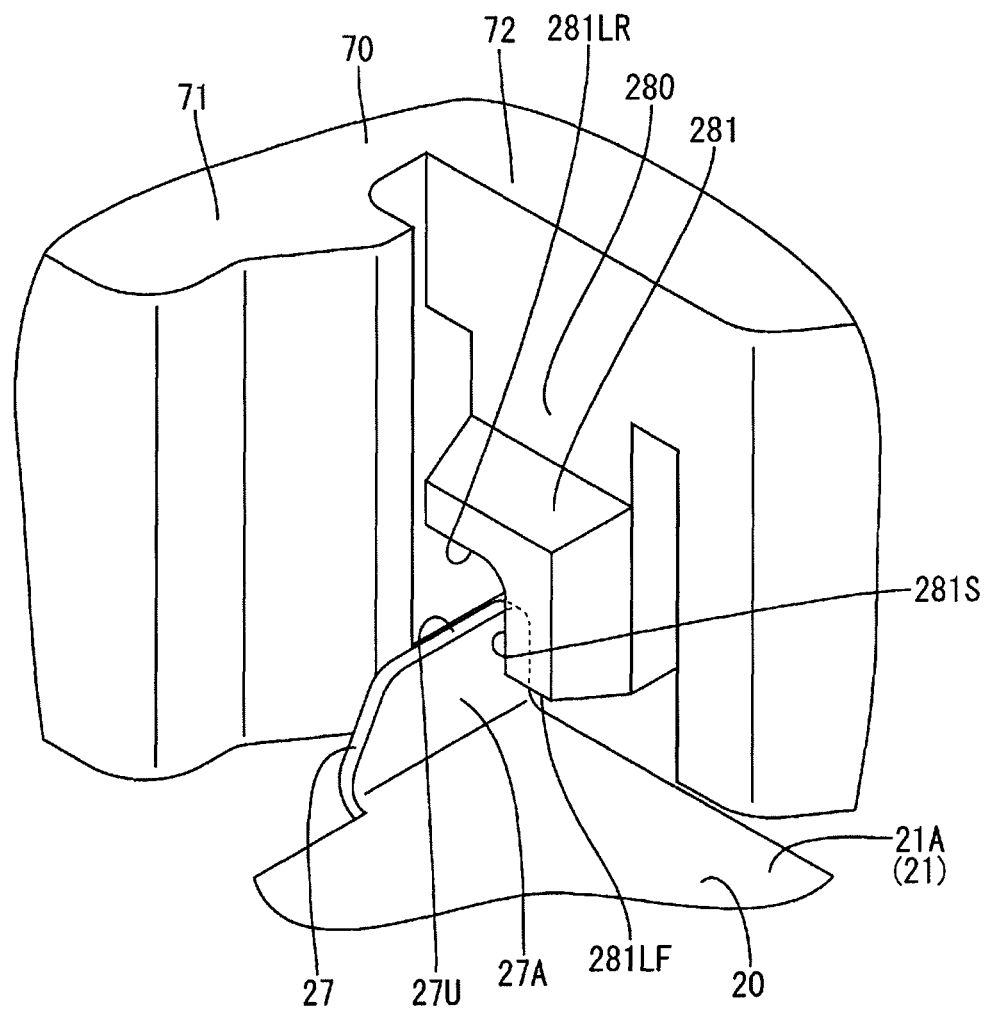
FIG. 7 is a partially enlarged perspective view of the detection terminal holding portion.
Figure 8:
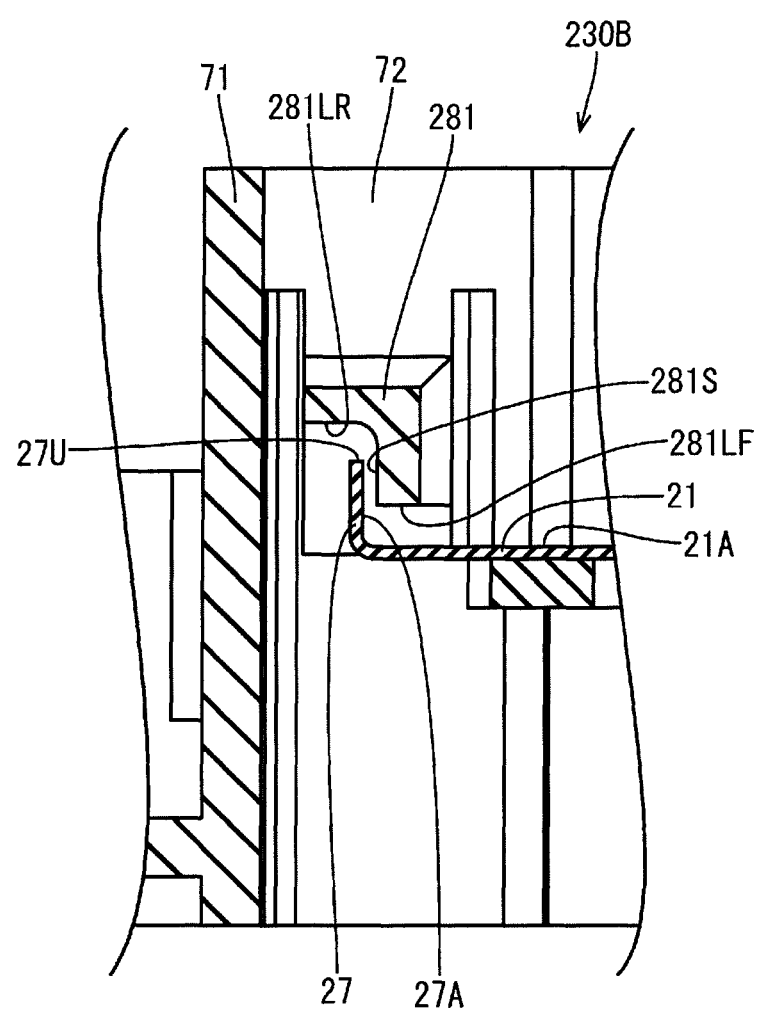
FIG. 8 is a sectional view along B-B in FIG. 6.

Embodiment 2 is described below, with reference to FIGS. 6 to 8. A connection module 201 according to Embodiment 2 differs from that in Embodiment 1 in the holding structure for the detection terminal 20. The holding structure in an end holding portion 230B at the right end of the front row is described as an example below. The same components as those in Embodiment 1 are given the same reference numerals, and their description is omitted.

In the end holding portion 230B in this embodiment, the same recess 70 as in Embodiment 1 is provided, and a locking piece 280 is provided on the inner surface of the side wall 72. The locking piece 280 is in a cantilever form having a lower end as a free end, as with the locking piece 80 in Embodiment 1. A claw portion 281 projecting in the inward direction of the end holding portion 230B in an approximately trapezoidal shape in a top view and having approximately an L shape in a side view is formed at the lower end of the locking piece 280, as shown in FIGS. 6 to 8. The upper edge 27U of the projection portion 27 of the detection terminal 20 can be placed on the lower side of the lower surface 281LR near the base end wall 71 from among the lower surfaces 281L of the stepped claw portion 281, and the plate surface 27A of the projection portion 27 can be placed on the base end wall 71 side of the step portion 281S of the claw portion 281.

The detection terminal 20 can be held at a predetermined position in the end holding portion 230B by pushing the detection terminal 20 from above, as in the case of the end holding portion 30B in Embodiment 1.

According to this embodiment, the lower surface 281LR of the claw portion 281 functions as a first locking portion that locks the upper edge 27U of the projection portion 27 and restricts the movement of the detection terminal 20 in the upward direction (first direction D1), i.e. the direction orthogonal to the plate surface 21A. Moreover, the step portion 281S of the claw portion 281 functions as a second locking portion that locks the plate surface 27A of the projection portion 27 and restricts the movement of the detection terminal 20 in the direction along the axis L1 (second direction D2), i.e. the direction parallel to the plate surface 21A. Further, the lower surface 281LF located below the lower surface 281L of the claw portion 281 faces the plate surface 21A of the body portion 21 of the detection terminal 20 to reliably prevent the detection terminal 20 from rising, as shown in FIGS. 7 and 8.

Embodiment 3

Figure 9:
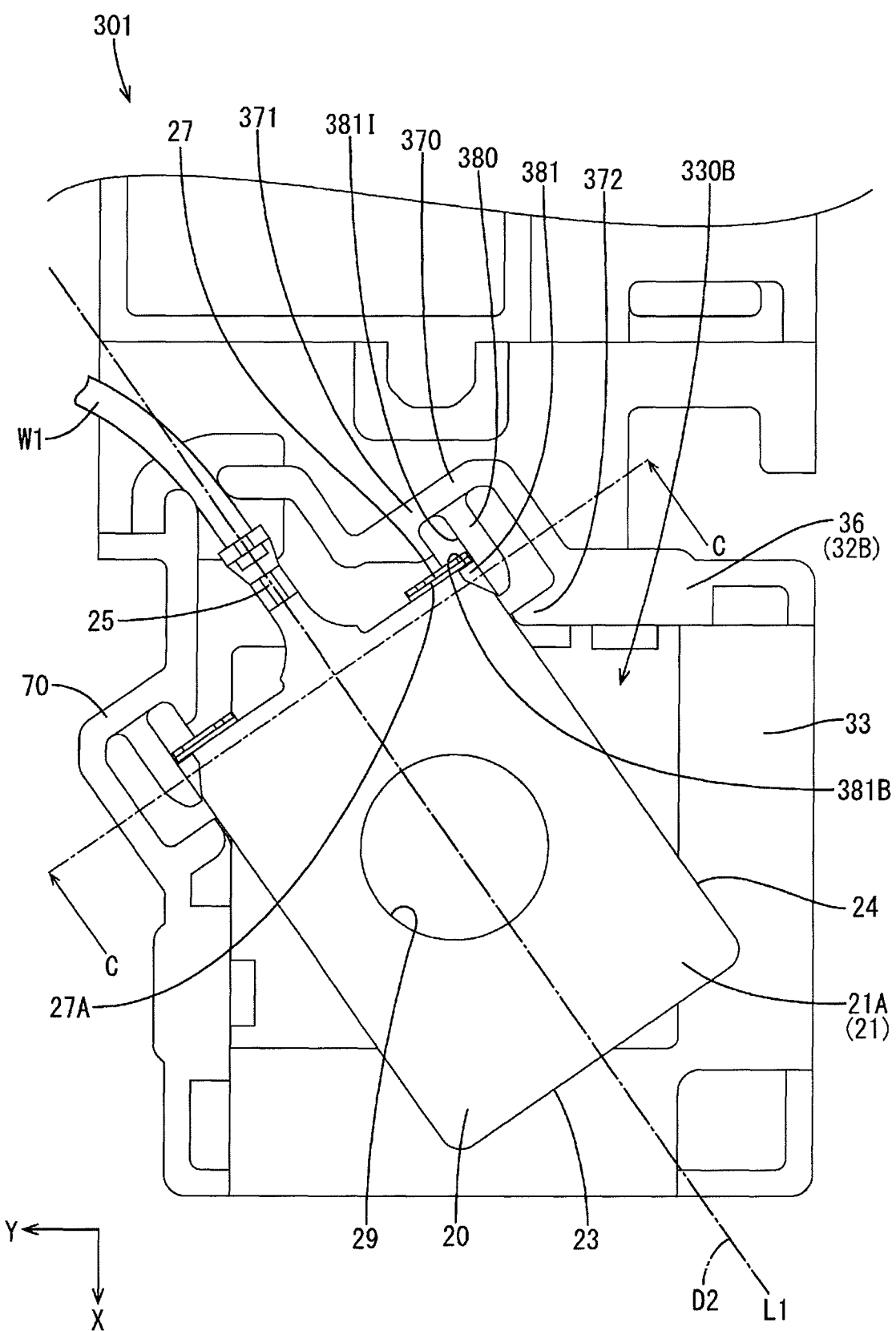
FIG. 9 is a partially enlarged plan view of a detection terminal holding portion in a connection module according to Embodiment 3.

Embodiment 3 is described below, with reference to FIGS. 9 and 10. A connection module 301 according to Embodiment 3 also differs from that in Embodiment 1 in the holding structure for the detection terminal 20. The holding structure in an end holding portion 330B at the right end of the front row is described as an example below. The same components as those in Embodiment 1 are given the same reference numerals, and their description is omitted.

In the end holding portion 330B in this embodiment, a recess 370 having a base end wall 371 and a side wall 372 is formed at the same position as the recess 70 in Embodiment 1. The recess 370 is formed so as to hollow out the left wall 35B and rear wall 36B of the housing wall 32B. Inside the recess 370, a locking piece 380 elastically deformable toward the outside of the holding portion 30 protrudes from the base end wall 371. The locking piece 380 protrudes in the direction along the axis L1 at the position opposite the side edge 24, in a state in which the detection terminal 20 is held. A claw portion 381 projecting in the inward direction of the end holding portion 330B in an approximately trapezoidal shape in a top view and a side view is formed at the protrusion end of the locking piece 380, as shown in FIGS. 9 and 10. The body portion 21 of the detection terminal 20 can be placed on the lower side of the lower surface 381L of the claw portion 381, and the plate surface 27A of the projection portion 27 can be placed on the base end wall 371 side of the claw portion 381.

To hold the detection terminal 20 in the end holding portion 330B, the detection terminal 20 is pushed toward the base end wall 371 from diagonally above the pillar portion 34 in a state in which the front edge 23 is raised slightly. As a result, the projection portion 27 (the base edge 22 of the body portion 21) comes into contact with the claw portion 381 from the front, and consequently the locking piece 380 elastically deforms toward the outside of the side wall 372. When the detection terminal 20 is pushed further and the projection portion 27 reaches closer to the base end wall 371 side than the side surface 381B of the claw portion 381, the locking piece 380 elastically recovers, and the claw portion 381 is located on the upper side of the plate surface 21A and the front edge 23 side of the plate surface 27A.

According to this embodiment, the lower surface 381L of the claw portion 381 functions as a first locking portion that locks the plate surface 21A of the body portion 21 and restricts the movement of the detection terminal 20 in the upward direction (first direction D1), i.e. the direction orthogonal to the plate surface 21A. Moreover, the side surface 381B of the claw portion 381 on the base end wall 371 side functions as a second locking portion that locks the plate surface 27A of the projection portion 27 and restricts the movement of the detection terminal 20 in the direction along the axis L1 (second direction D2), i.e. the direction parallel to the plate surface 21A. Further, the inner surface 3801 of the locking piece 380 locks the side edge 24 of the body portion 21 of the detection terminal 20 to reliably prevent the detection terminal 20 from rotating and the like, as shown in FIG. 9.

Other Embodiments

The technique disclosed herein is not limited to the embodiments described by way of the above descriptions and drawings, and embodiments such as the following are also encompassed in the technical scope.

(1) The locking piece 80 or the like is not limited to the structure including the claw portion 81 or the like described in the foregoing embodiments, as long as it includes the first locking portion and the second locking portion. The locking by the first locking portion and the locking by the second locking portion are not limited to surface locking described in the foregoing embodiments, and may also be locking through line contact or point contact.

(2) The conductive member is not limited to the detection terminal 20. For example, a projection portion may also be formed at one edge of the bus bar 40 described in the foregoing embodiments, and the locking piece 80 or the like may be provided in the connection holding portion 30A.

(3) The projection portion 27 should project in a direction intersecting with the plate surface 21A of the body portion 21, but is not limited to the structure including the plate surface 27A that is perpendicular to the plate surface 21A described in the foregoing embodiments. For example, the projection portion 27 may also be formed so that the plate surface 27A intersects at an acute angle with the plate surface 21A, where the locking piece 80 has the claw portion 81 insertable into this inside corner.

(4) Although the foregoing embodiments describes the structure in which the detection terminal 20 is held in the holding portion 30 of the insulation protector 10 at an angle of inclination with respect to the connection member extending direction, this is not a limitation. For example, Embodiment 3 may be modified as follows: The axis L1 of the detection terminal 20 extends in the front-back direction, the detection electric wire W1 is led from the gap 37 provided at an appropriate position in the rear wall 36B, and the locking piece 380 directly protrudes from the rear wall 36B (functioning as the base end wall 371).

LIST OF REFERENCE NUMERALS

M1 battery module (power storage module)
1 connection module
6 single battery group (power storage element group)
10 insulation protector
20 detection terminal (conductive member)
21 body portion
21A plate surface
22 base edge (one edge)
23 front edge
24 side edge
25 barrel portion (connection portion)
27 projection portion
27A plate surface
30, 230, 330 holding portion
30A connection holding portion
30B, 230B, 330B end holding portion
40 bus bar (connection member)
50 electric wire housing groove
60 single battery (power storage element)
65 electrode terminal
71, 371 base end wall
72, 372 side wall
80, 280, 380 locking piece
81, 281, 381 claw portion
81L, 281L, 381L lower surface (first locking portion)
81B side surface (second locking portion)
281S step portion (second locking portion)
381B side surface (second locking portion)
W1 detection electric wire
L1 axis
D1 first direction
D2 second direction

The invention claimed is:

1. A connection module that is attached, from a first direction, to a power storage element group formed by lining up a plurality of power storage elements each including an electrode terminal, the connection module comprising:
　a conductive member connected to at least one of the electrode terminals; and
　an insulation protector including a holding portion holding the conductive member,
　wherein the conductive member includes:
　　a body portion made of a metal plate material in an approximately rectangular plate shape; and
　　a projection portion projecting from one edge of the body portion in a direction upwardly from a plate surface of the body portion to intersect with the plate surface of the body portion, and
　the holding portion includes a locking piece including:
　　a first locking portion that restricts a movement of the conductive member in a direction orthogonal to the plate surface of the body portion; and
　　a second locking portion that restricts a movement of the conductive member in a direction parallel to the plate surface of the body portion.

2. The connection module according to claim 1, wherein the first locking portion locks one of the plate surface of the body portion or the projection portion in the first direction, and the second locking portion locks the projection portion in a direction parallel to the plate surface of the body portion.

3. The connection module according to claim 1,
wherein the conductive member includes a plurality of the projection portions, and further includes a connection portion extending from the one edge and connected to a terminal of an electric wire, and
the connection portion is located between the projection portions along the one edge.

4. The connection module according to claim 1,
wherein the holding portion includes a base end wall opposite the one edge of the body portion, and the locking piece is formed on the base end wall as a deflectable elastic piece.

5. The connection module according to claim 1,
wherein the holding portion includes a base end wall opposite the one edge of the body portion and a side wall opposite two side edges linked to both sides of the one edge of the body portion, and the locking piece is formed on the side wall as a deflectable elastic piece.

* * * * *